United States Patent

Fini, Jr.

[11] Patent Number: 5,394,764
[45] Date of Patent: Mar. 7, 1995

[54] BEVEL GEAR FORWARD/REVERSE

[76] Inventor: Anthony W. Fini, Jr., 4273 Mundy St., Blasdell, N.Y. 14219

[21] Appl. No.: 107,635

[22] Filed: Aug. 18, 1993

[51] Int. Cl.$^6$ .............................. F16H 35/00
[52] U.S. Cl. ...................... 74/378; 74/355; 74/376
[58] Field of Search ............ 74/355, 376, 378, 323, 74/324, 322; 192/67 P

[56] References Cited

U.S. PATENT DOCUMENTS

| | | | |
|---|---|---|---|
| 656,380 | 8/1900 | Smith | 74/355 |
| 1,671,033 | 5/1928 | Kimura | 74/355 |
| 2,992,566 | 7/1961 | Walker | 74/355 |
| 3,214,987 | 11/1965 | Schenck | 74/355 |
| 4,796,737 | 1/1989 | Tyler | 192/67 P X |

Primary Examiner—Charles A. Marmor
Assistant Examiner—Peter Kwon

[57] ABSTRACT

A bevel gear forward/reverse mechanism comprises bevel gears, a locking device for forward drive and a band brake for reverse drive. The locking device includes tapered pins mounted to a flanged hub which is slidably mounted on an input shaft of a differential unit and locks the input shaft to the differential unit for forward drive. The differential unit is unlocked when the band brake stops the differential unit from rotating for reverse drive. This mechanism also provides a neutral and a drive shaft brake.

5 Claims, 1 Drawing Sheet

BEVEL GEAR FORWARD/REVERSE

BACKGROUND OF THE INVENTION

Many methods for a reversal of a drive or a power output shaft have been used or tried in the past as evidenced by U.S. Pat. Nos. 2,150,456 and 3,939,732. Sometimes reversal of a drive is not that necessary, such as in a small mini-bike or motorcycle as in U.S. Pat. No. 3,625,079. However, a practical reverse drive for some motor vehicles is a necessity. Electric starter motors have even been used as a method for reverse in order to spare additional complexity and/or cost, especially in small motor vehicles utilizing mechanical torque converters or continuously variable transmissions.

Low cost differential units are available and are simple and well built as evidenced by U.S. Pat. No. 3,406,592. Therefore the present invention is directed towards a very practical and advantageous method for a forward and reverse drive.

DRAWINGS

DETAILED DESCRIPTION

Figure 1A:
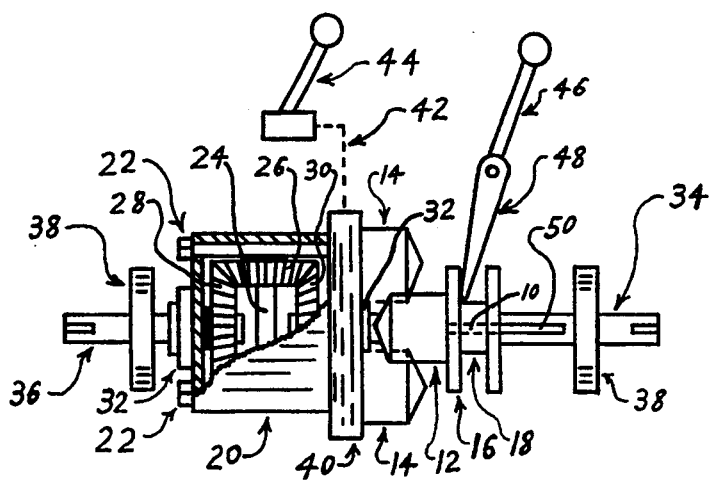
FIGS. 1 and 1A are front view and side view illustrating the mechanism. The casing is partially cut away to show internal parts.
Figure 1B:
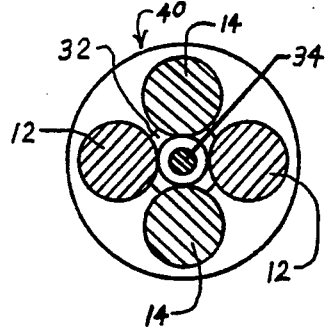
Figure 2:
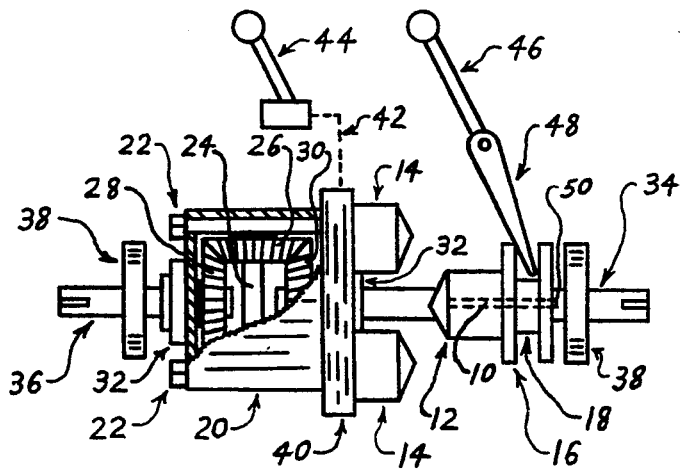
FIG. 2 is the same as FIG. 1, but illustrating a different mode of operation.

In FIG. 1 and FIG. 2 casing 20 houses a standard differential unit which has bearings 32 supporting casing 20 on shafts 34 and 36 while allowing rotation of shafts 34 and 36. Bearings 38 support shafts 34 and 36 and are also used to mount the mechanism. Bevel gear 28 is mounted on and drives output shaft 36 while bevel gear 30 is mounted on and is driven by input shaft 34. Pinion shaft 24 is fixed within casing 20. Bevel gear(s) 26 are mounted on pinion shaft 24 and are in mesh with bevel gears 28 and 30. Only one bevel gear 26 is shown because it should be understood that most differential units incorporate at least two of these gears, opposite each other on pinion shaft 24, for both balance and strength. However only one bevel gear 26 is actually necessary for function. Casing 20 is a mounting means for pinion shaft 24 and is also a mounting means for the drum of band brake 40 and large pins 14. Bolts 22 go right through the outsides of casing 20 and thread into the two large pins 14. Lever 44 through cable 42 (or linkage) selectively actuates band brake 40. Flange 16 is attached to hub: 18 which is mounted on shaft 34. Hub 18 has an internal keyway 10 so that it can slide on key 50 of shaft 34. Flange 16 also has attached, opposing one another on flange 16, large pins 12. Lever 46 is attached to fork 48 which selectively slides hub 18 and flange 16 with pins 12 along shaft 34.

In the operation of the mechanism, FIG. 1 shows that through lever 46 pins 12 are in between pins 14 and all the bevel gears 26, 28, and 30 are locked stationary and through lever 44 band brake 40 is released so that when power is transmitted to input shaft 34 outgut shaft 36 rotates in the same direction. FIG. 2 shows that through lever 46 pins 12 and pins 14 are free from one another and all the bevel gears 26, 28, and 30 are also free to drive one another and through lever 44 band brake 40 is stopping casing 20 from rotation so that when power is transmitted to input shaft 34 output shaft 36 rotates in the opposite direction.

Lever 46 and lever 44 could be combined so that they work in unison and only one control would then be necessary for forward or reverse. However, in FIG. 1 if lever 44 is applied it stops both input shaft 34 and output shaft 36 and acts as a drive shaft brake. In FIG. 2 if lever 44 is released and power is transmitted to input shaft 34 bevel gears 26 and 30 revolve along with casing 20 and no power is transmitted to output shaft 36 and so providing a neutral.

In conclusion, the number or size of pins 12 and 14 utilized is not that critical to the function of the invention as long as they are capable of sliding in between one another and locking or unlocking casing 20 to input shaft 34 while maintaining sufficient strength. Also, input shaft 34 of the mechanism helps provide a mounting means for many types of variable speed drives or transmissions. And, the mechanism could be utilized turned around so that output shaft 36 is the input shaft.

I claim:

1. A forward and reverse mechanism comprising:

a first bevel gear mounted on an input shaft to be driven by said input shaft;

a second bevel gear mounted on an output shaft for driving said output shaft;

a third bevel gear mounted on a pinion shaft for rotation thereon;

mounting means for said pinion shaft so that said third bevel gear is in mesh with said first and second bevel gears, wherein said mounting means and/or said output shaft are rotatably driven by said input shaft, said mounting means having pins mounted thereon;

a band brake mounted on said mounting means for stopping said mounting means from rotation or releasing said mounting means for rotation;

a hand operated lever connected to said band brake to control the stopping or releasing of said mounting means;

a flanged hub slidably mounted on a keyway of said input shaft, said flanged hub having a flange;

a hand operated lever with a fork contacting said flanged hub for sliding said flanged hub on said input shaft towards said mounting means or away from said mounting means, said flanged hub having pins connected to said flange, said pins facing said pins mounted on said mounting means, said pins having tapered ends so that when said flanged hub slides on said input shaft towards said mounting means said pins go in between each other and rotatably lock said first shaft to said mounting means wherein said bevel gears are locked stationary, and when said band brake releases said mounting means for rotation said input shaft rotates said output shaft in the same direction, but when said band brake stops said mounting means from rotation and said flanged hub slides on said input shaft away from said mounting means so that said pins are not in between each other and said mounting means is not locked to said input shaft, said input shaft rotates said output shaft in the opposite direction, whereby forward and reverse drive is provided.

2. A mechanism as described in claim 1, wherein when said input shaft is not locked to said mounting means and said band brake releases said mounting means for rotation, said input shaft rotatably drives said mounting means instead of said output shaft, whereby neutral is provided.

3. A mechanism as described in claim 1, wherein when said input shaft is locked to said mounting means, said band brake can be applied for stopping both said input and output shafts, whereby a drive shaft brake is provided.

4. A forward and reverse mechanism comprising:
a first bevel gear mounted on an input shaft to be driven by said input shaft;
a second bevel gear mounted on an output shaft for driving said output shaft;
a third bevel gear mounted on a pinion shaft for rotation thereon;
a mounting means for said pinion shaft so that said third bevel gear is in mesh with said first and second bevel gears, wherein said mounting means and/or said output shaft are rotatably driven by said input shaft, said mounting means having pins mounted thereon;
a stop means for stooping said mounting means from rotation or releasing said mounting means for rotation;
a flanged hub slidably mounted on a keyway of said input shaft, said flanged hub having a flange;
a hand operated lever with a fork contacting said flanged hub for sliding said flanged hub on said input shaft towards said mounting means or away from said mounting means, said flanged hub having pins connected to said flange, said pins facing said pins mounted on said mounting means, said pins having tapered ends so that when said flanged hub slides on said input shaft towards said mounting means said pins go in between each other and rotatably lock said first shaft to said mounting means wherein said bevel gears are locked stationary, and when said stop means releases said mounting means for rotation, said input shaft rotates said output shaft in the same direction, but when said stop means stops said mounting means from rotation and said flanged hub slides on said input shaft away from said mounting means so that said pins are not in between each other and said mounting means is not locked to said input shaft, said input shaft rotates said output shaft in the opposite direction whereby forward and reverse drive is provided.

5. A forward and reverse mechanism comprising:
a first bevel gear mounted on a first shaft to be driven by said first shaft;
a second bevel gear mounted on a second shaft for driving said second shaft;
a third bevel gear mounted on a pinion shaft for rotation thereon;
a mounting means for said pinion shaft so that said third bevel gears is in mesh with said first and second bevel gears, wherein said mounting means and/or said second shaft are rotatably driven by said first shaft;
so that said first shaft drives said mounting means and/or said second shaft;
a stop means mounted on said mounting means for stopping said mounting means from rotation or releasing said mounting means for rotation; a means for locking said first shaft to said mounting means wherein said bevel gears are also locked relative to the first shaft, and when said stop means releases said mounting means for rotation, said first shaft rotates said second shaft in the same direction, but when said stop means stops said mounting means from rotation and said mounting means is not locked to said first shaft, said first shaft rotates said second shaft in the opposite direction, whereby forward and reverse drive is provided.

* * * * *